United States Patent
Suzuki et al.

(10) Patent No.: US 6,845,228 B2
(45) Date of Patent: Jan. 18, 2005

(54) SHEET TREATING APPARATUS AND IMAGE FORMING APPARATUS

(75) Inventors: Toshimasa Suzuki, Chiba (JP); Yoshimi Mizuta, Chiba (JP); Masaaki Inoo, Tokyo (JP); Daisaku Kamiya, Chiba (JP); Hiromichi Tsujino, Ibaraki (JP); Junichi Moteki, Chiba (JP); Sunsuke Nishimura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/232,615

(22) Filed: Sep. 3, 2002

(65) Prior Publication Data

US 2003/0049063 A1 Mar. 13, 2003

(30) Foreign Application Priority Data

Sep. 7, 2001 (JP) .................................. 2001-272179
Aug. 21, 2002 (JP) .................................. 2002-240237

(51) Int. Cl.[7] .............................................. G03G 15/00
(52) U.S. Cl. ................. 399/407; 270/58.11; 270/58.13; 270/58.14; 399/408; 399/410
(58) Field of Search ................. 399/405, 406, 399/407, 408, 410, 107, 397, 401, 403, 404; 270/58.11, 58.14; 279/58.13

(56) References Cited

U.S. PATENT DOCUMENTS

| | | | |
|---|---|---|---|
| 5,348,283 A | 9/1994 | Yanagi et al. ................ 271/127 |
| 5,370,380 A | 12/1994 | Suzuki et al. ................. 271/21 |
| 5,508,796 A | 4/1996 | Sasame et al. ............... 355/271 |
| 5,580,042 A | 12/1996 | Taniguro et al. ............. 271/274 |
| 5,592,280 A | 1/1997 | Ishizuka et al. ............. 399/410 |
| 5,620,174 A | 4/1997 | Taniguro et al. ......... 271/10.12 |
| 5,648,808 A | 7/1997 | Yanagi et al. ................ 347/104 |
| 5,672,019 A | 9/1997 | Hiramatsu et al. .......... 400/624 |
| 5,709,376 A * | 1/1998 | Ushirogata ............... 270/58.11 |
| 5,725,319 A | 3/1998 | Saito et al. .................. 400/629 |
| 5,850,582 A | 12/1998 | Inoo et al. ...................... 399/8 |
| 6,088,567 A | 7/2000 | Miyashiro et al. .......... 399/400 |
| 6,134,418 A * | 10/2000 | Kato et al. ................... 399/405 |
| 6,151,477 A | 11/2000 | Takeuchi et al. ............ 399/318 |
| 6,168,270 B1 | 1/2001 | Saikawa et al. ............. 347/104 |
| 6,336,016 B1 * | 1/2002 | Ikeda .......................... 399/107 |
| 6,371,476 B2 | 4/2002 | Isogai et al. ................ 271/3.14 |
| 6,398,214 B1 | 6/2002 | Moteki et al. ............... 271/220 |
| 6,496,670 B1 * | 12/2002 | Ishikita et al. .............. 399/107 |
| 6,522,862 B2 * | 2/2003 | Koshimizu et al. ......... 399/405 |
| 2002/0000689 A1 | 1/2002 | Isogai et al. ................ 271/3.14 |

FOREIGN PATENT DOCUMENTS

| | | |
|---|---|---|
| JP | 5-58537 | 3/1993 |
| JP | 11-278742 | 10/1999 |

* cited by examiner

Primary Examiner—Hoan Tran
(74) Attorney, Agent, or Firm—Fitzpatrick, Cella, Harper & Scinto (57) ABSTRACT

In a sheet treating apparatus for treating sheets on which images have been formed, the sheets are upwardly transported by transport rollers, etc., and are transported to an intermediate treatment tray, where the sheets are subjected to treatment such as stapling, and then the sheets can be delivered to a delivery tray disposed in a substantially vertical state above the intermediate treatment tray.

7 Claims, 13 Drawing Sheets

SHEET TREATING APPARATUS AND IMAGE FORMING APPARATUS

BACKGROUND OF THE INVENTION

1. Field of the Invention

This invention relates to a sheet treating apparatus and an image forming apparatus which enable their installation spaces to be made small. Particularly, it relates to an image forming apparatus of which the space saving can be realized without spoiling the visual confirmability and taking-out operability of delivered sheets.

2. Description of Related Art

As an image forming apparatus such as a copying machine or a facsimile apparatus provided with an original image reading portion, there has heretofore been popular an apparatus in a form having an image reading portion disposed in the upper portion of the apparatus, and provided with an image forming portion below it, and in which recording sheets on which images have been formed by the image forming portion are delivered outwardly of a side of the apparatus and are stacked there.

Figure 12:
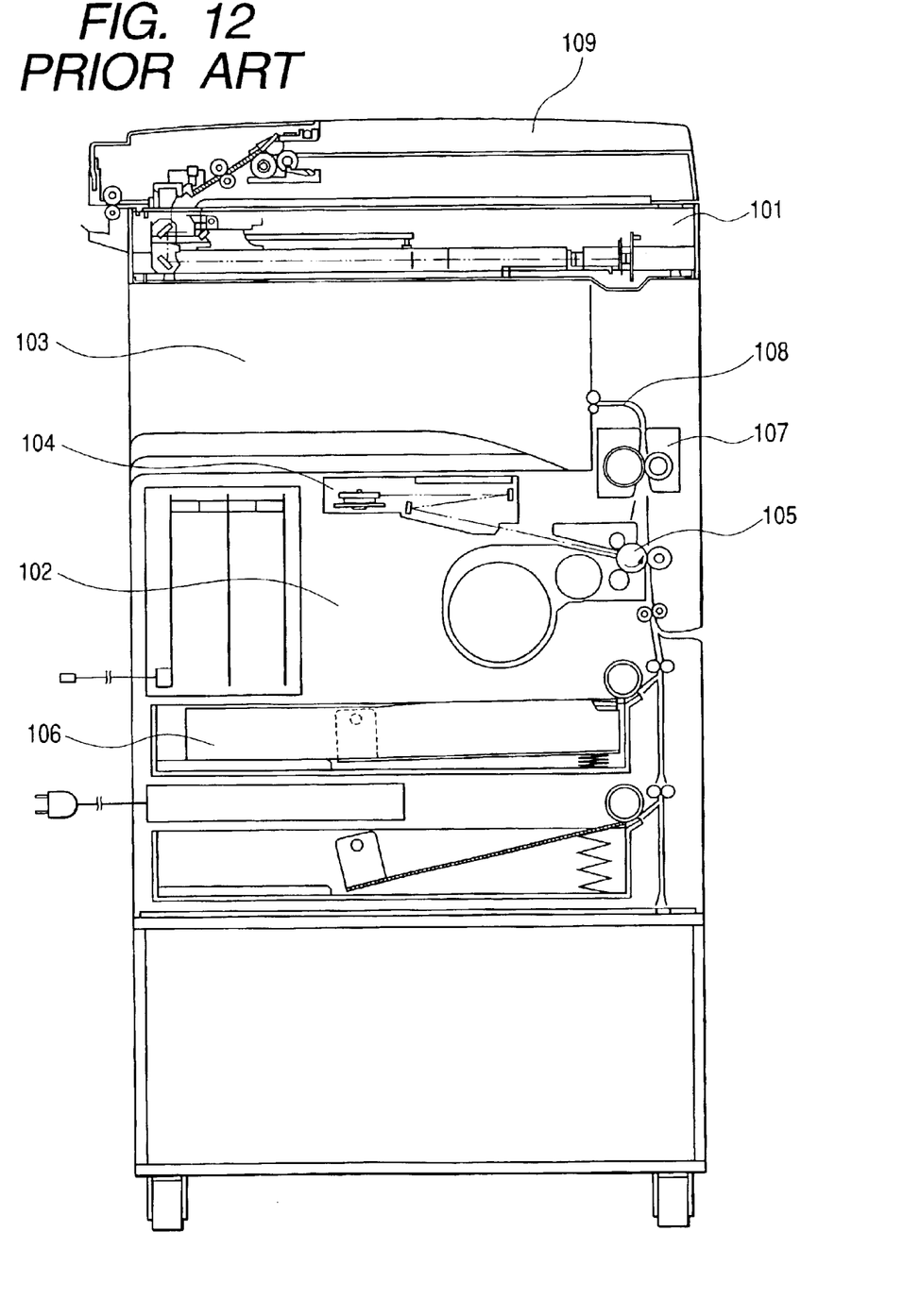
FIG. 12 is an illustration of an image forming apparatus according to the prior art.

In recent years, however, there is an apparatus in which for the purpose of space saving, as shown in FIG. 12 of the accompanying drawings, a space 103 is provided between an image reading portion 101 and an image forming portion 102, and recording sheets are delivered to and stacked in this space 103.

In the image reading portion 101, an original fed from an auto original feeder (hereinafter referred to as the "ADF") 109 is exposed and scanned, whereby image information is taken into a photoelectric transfer element, and data processing is carried out.

On the basis of the data, a laser scanner 104 scans on a photosensitive drum 105, to thereby effect the formation of a latent image. A toner image developed on the photosensitive drum 105 in accordance with the latent image is transferred onto a sheet fed and transported from a feed cassette 106, and is passed through a fixing device 107 and is fixed on the sheet, which is then delivered to and stacked in the delivery space 103 by delivery rollers 108.

Figure 13:
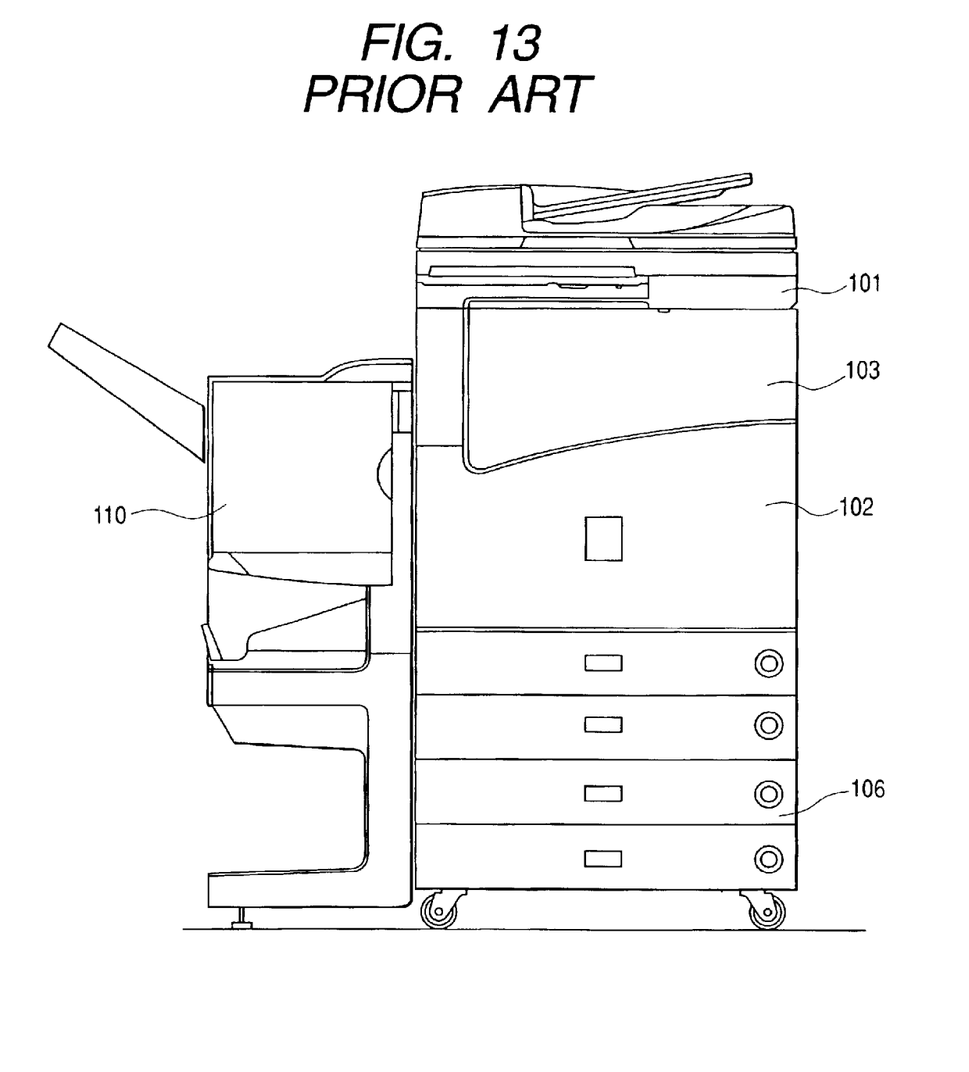
FIG. 13 is an illustration showing a sheet treating apparatus as it is connected to a side of the main body of the apparatus.

When in the above-described image forming apparatus, post-treatment such as punching treatment or stapling treatment is to be effected on the sheet on which the image has been recorded, as shown in FIG. 13 of the accompanying drawings, a sheet treating apparatus 110 is connected to a side of the main body of the apparatus, and the sheet is fed into this sheet treating apparatus 110 to thereby effect stapling treatment or the like.

However, if the sheet treating apparatus 110 is connected to a side of the main body of the apparatus, a wide installation space becomes necessary. If an attempt is made to make this space small, the structure of the apparatus will become complicated or the sheet taking-out operability will become bad.

SUMMARY OF THE INVENTION

The present invention has been made in view of the above-noted points and the object thereof is to provide a sheet treating apparatus and an image forming apparatus of which the space saving can be realized without spoiling the visual confirmability and taking-out operability of delivered sheets.

A typical construction according to the present invention for achieving the above object is a sheet treating apparatus for treating a sheet on which an image has been formed, provided with transporting means for upwardly transporting the sheet, and a sheet delivery portion disposed above the sheet transporting means, the sheet delivery portion having at least one delivery tray disposed in a substantially vertical state.

As described above, in the present invention, the sheet delivery portion is disposed above the sheet transporting means, and therein the delivery tray is disposed in a substantially vertical state and therefore, the visual confirmability of the delivered sheet is not spoiled, and even if the size of the sheet is large, a delivery space in a lateral direction is not required and thus, the space saving of the apparatus becomes realizable.

DESCRIPTION OF THE PREFERRED EMBODIMENTS

An image forming apparatus provided with a sheet treating apparatus according to a first embodiment of the present invention will now be described with reference to the drawings.

[First Embodiment]

Figure 1:
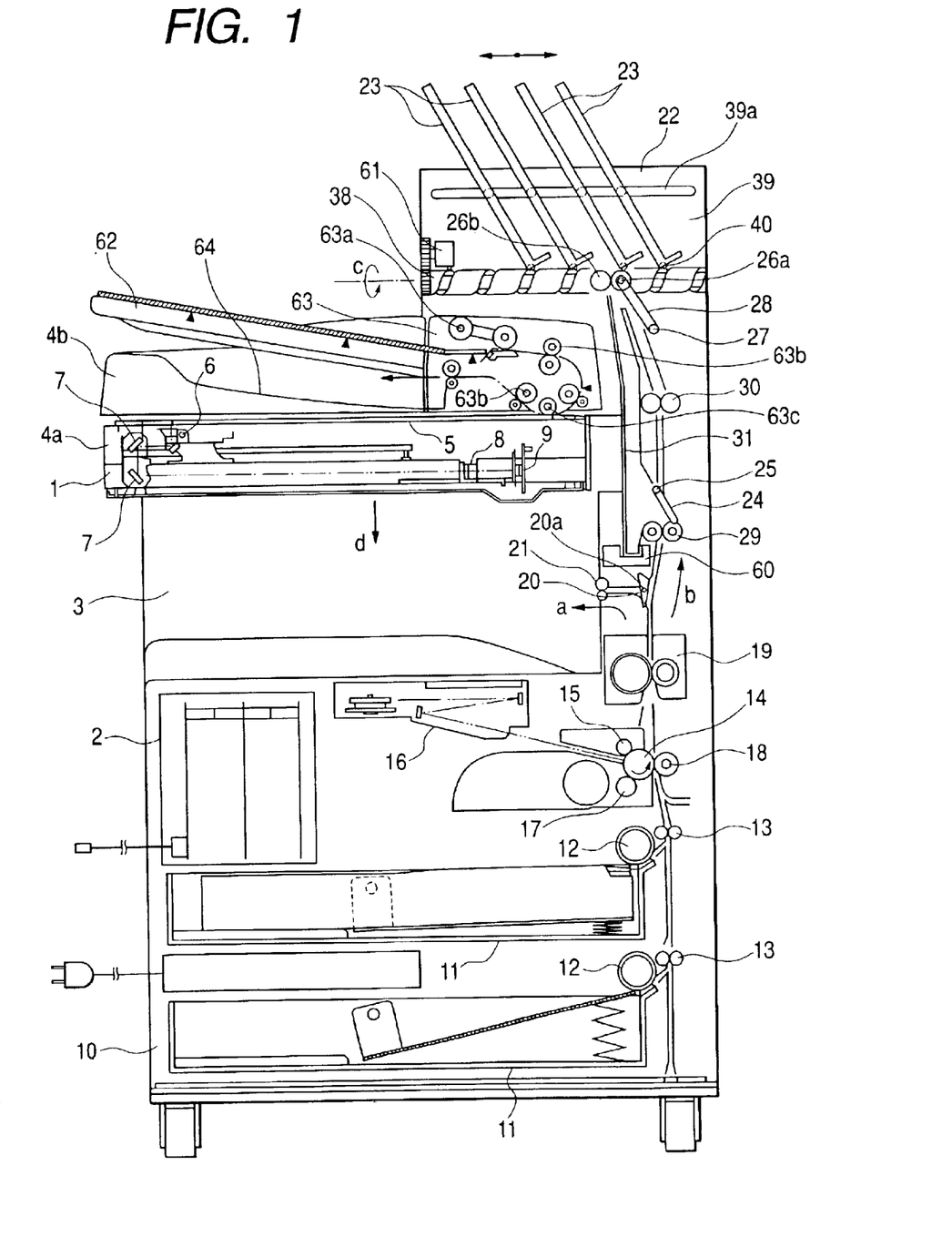
FIG. 1 is a general cross-sectional illustration of an image forming apparatus according to a first embodiment.

FIG. 1 is a general cross-sectional illustration of the image forming apparatus according to the first embodiment.

{General Construction of the Image Forming Apparatus}

This image forming apparatus has an image reading portion 1 which is image reading means, and an image forming portion 2 which is image forming means, and the image reading portion 1 is disposed above the image forming portion 2. A delivery space portion 3 for delivering a sheet on which an image has been recorded by the image forming portion 2 is formed in the apparatus housing between the two, whereby the image forming apparatus is made into an image forming apparatus of the so-called in-body delivery type. Also, above the image forming portion 2, there is provided a sheet treating apparatus for effecting treatment such as punching or stapling on the sheet on which an image has been formed.

(Image Reading Portion)

The image reading portion 1 in the present embodiment is such that an ADF 4b is mounted on a scanning optical system 4a for optically reading an original, and an original fed from the ADF 4b onto a platen glass plate 5 or an original directly set on the platen glass plate 5 with the ADF 4b pivotally moved and opened is exposed and scanned by the scanning optical system 4a to thereby read the original. That is, the image reading portion 1 applies light to the original on the platen glass plate 5 while scanning a light source 6, and the reflected light therefrom is condensed on a photo-electric transfer element 9 through the intermediary of a mirror 7 and a lens 8 and is transferred into an electrical digital signal, which is transmitted. If this digital signal is transmitted to the image forming portion 2 of the apparatus itself, the apparatus will function as a copying machine, and if the digital signal is transmitted to the image forming portion of other apparatus, the apparatus will function as a facsimile apparatus.

The image reading portion 1 need not always have the ADF 4b mounted thereon. That is, it may be provided with an original pressing member for pressing the original set on the platen glass plate 5 of the scanning optical system 4a.

(Image Forming Portion)

The image forming portion 2 serves to form a toner image on a sheet transported from a sheet cassette 11 provided in a sheet feeding portion 10 disposed below the image forming portion 2 by a feed roller 12 and transport rollers 13, by the electrophotographic process. That is, the surface of a photosensitive drum 14 rotated in the direction indicated by the arrow in FIG. 1 is uniformly charged by a charging roller 15, and this photosensitive drum 14 is selectively exposed by a laser scanner 16 for applying light on the basis of image information transmitted from the aforedescribed image reading portion 1 or a personal computer or the like to thereby form a latent image. This latent image is developed into a visible image with a toner by a developing device 17, and the toner image is transferred to the transported sheet by the application of a bias voltage to a transferring roller 18.

The sheet to which the toner image has been transferred in the manner described above is intactly transported to a fixing device 19 located above the developing device, and there heat and pressure are applied to the sheet and the toner thereon is fixed, whereafter the sheet is delivered to a predetermined delivery portion.

That is, the sheet passed through the fixing device 19 is selected to and transported in the direction indicated by the arrow "a" or the arrow "b" by a first changeover flapper 20 being pivotally moved about a fulcrum 20a (FIG. 1 shows a state in which the direction indicated by the arrow "b" has been selected).

The selection of the transport direction indicated by the arrow "a" or the arrow "b" is determined by the delivery portion being pre-selected by an operator, and the selection of the delivery portion may be effected from the operating portion of the apparatus or a personal computer or the like during each job, but may be preset by the kind or substance of the job.

For example, in the case of a facsimile output which is small in frequency of use, it is to be understood that the sheet is always delivered from delivery rollers 21 to the delivery space portion 3, and the transport direction is set to the direction indicated by the arrow "a". On the other hand, in the case of a job such as copying or the job of a printer in which assortment becomes necessary, one of a plurality of delivery trays 23 provided in the delivery portion 22 located above the image reading portion 1 is selected and the transport direction is set to the direction indicated by the arrow "b".

Also, in the case of one-copy copying job in which assortment is unnecessary, it is possible to set the delivery space portion 3 as the destination of delivery in order to shorten the output time.

{Sheet Treating Apparatus}

Figure 2:
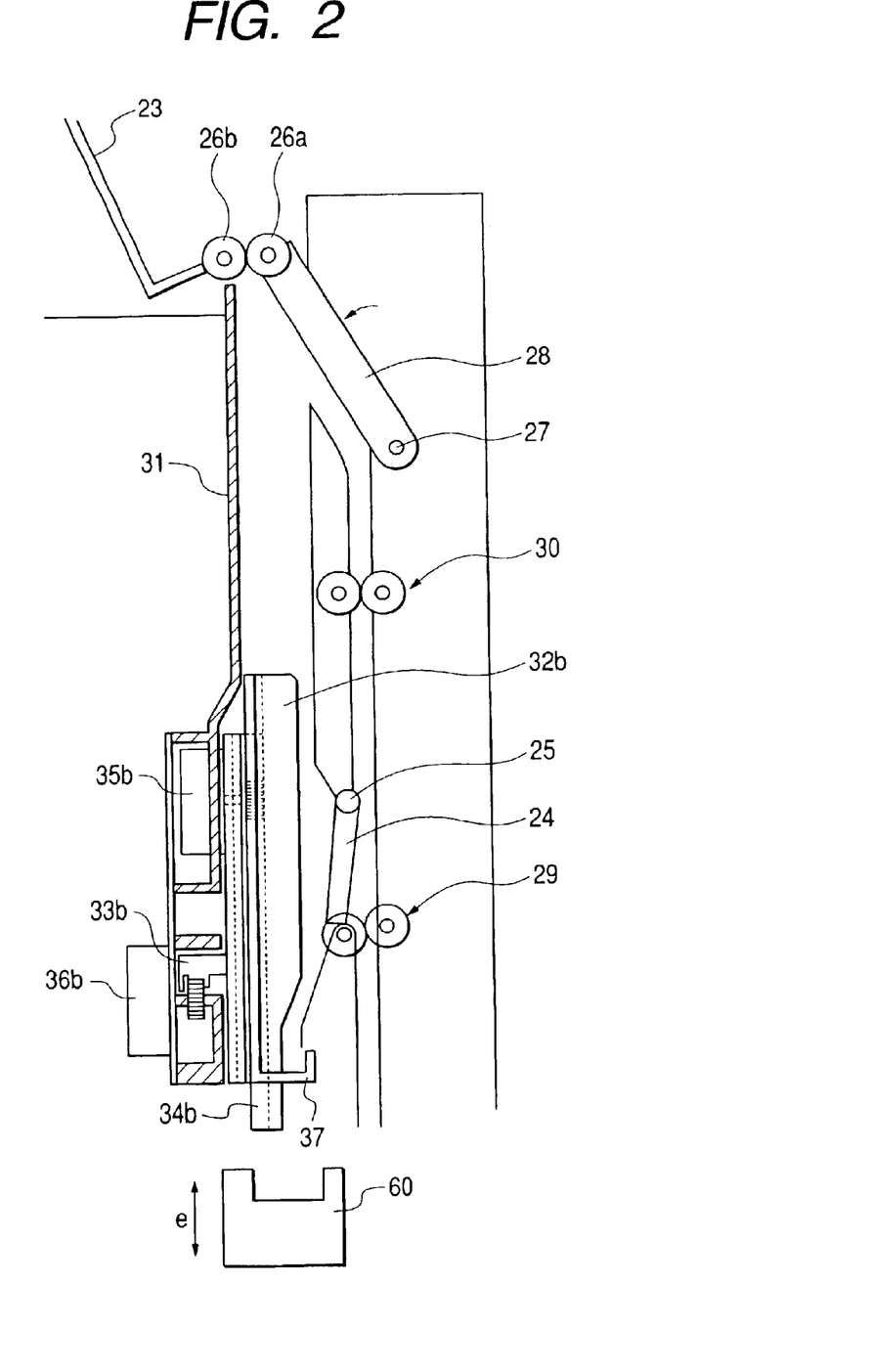
FIG. 2 is a cross-sectional illustration of a sheet post-treating portion when sheet post-treatment is not effected.
Figure 3:
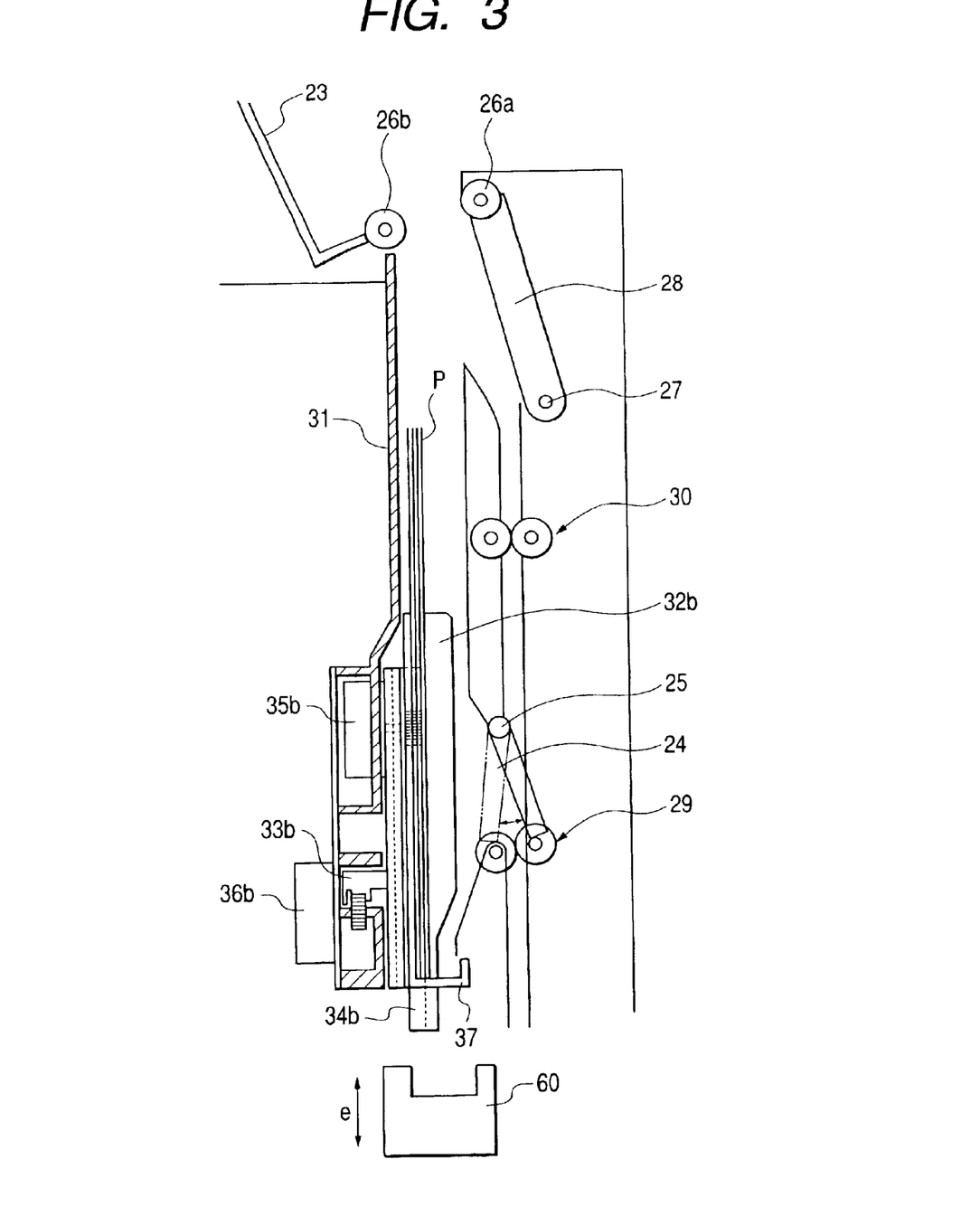
FIG. 3 is a cross sectional illustration of a sheet post-treating portion when the sheet post-treatment is effected.

Reference is now had to FIGS. 2 to 6 to describe the construction of a sheet treating apparatus in the present embodiment for effecting punching treatment or stapling treatment. The sheet treating apparatus of the present embodiment serves to transport the sheets on which images have been formed to an intermediate treatment tray 31 having a substantially vertical stacking surface, align them there and make them into a sheet bundle, and staple-treat it, and thereafter deliver it to the delivery portion above. FIG. 2 is a cross-sectional illustration of a sheet post-treating portion when sheet post-treatment is not effected, and FIG. 3 is a cross-sectional illustration of the sheet post-treating portion when intermediate treatment is effected.

(Transporting Means)

The sheet transported in the direction indicated by the arrow "b" in FIG. 1 by the first changeover flapper 20 has its transport direction changed over by a second changeover flapper 24 depending on the presence or absence of the post-treatment.

That is, in the case of a job which does not require sheet treatment such as stitching or punching, the second changeover flapper 24 is pivotally moved to a position shown in FIG. 2 about a fulcrum 25. At this time, a sheet-stack delivery roller 26a is supported by a rockable guide 28 rocking as a fulcrum 27, and is rotated to a position shown in FIG. 2.

The sheet is transported to a pair of sheet-stack delivery rollers 26a and 26b located substantially vertically upwardly by a pair of first transport rollers 29 and a pair of second transport rollers 30 as transporting means, and is delivered to and stacked on the delivery tray 23 located substantially vertically upwardly of the image forming portion 2.

Next, in the case of a job which requires sheet treatment, the second changeover flapper 24 is pivotally moved to a position indicated by solid line in FIG. 3 about a fulcrum 25, and the sheet P is transported toward the intermediate treatment tray 31. At this time, the rockable guide 28 supporting the sheet-stack delivery roller 26a is pivotally moved about a fulcrum 27 and the sheet-stack delivery roller 26a becomes spaced apart from the sheet-stack delivery roller 26b, and is retracted to a position shown in FIG. 3 during the transport of the sheet to the intermediate treatment tray 31 and the post-treatment of the sheet.

By the sheet-stack delivery roller 26a being thus retracted, the post-treating operation on the intermediate treatment tray 31 becomes possible even for a sheet of such a large size that the leading edge of the sheet goes beyond the sheet-stack delivery roller 26b during the alignment and post-treatment on the intermediate treatment tray 31.

Thereafter, when the trailing edge of the sheet P has passed through the pair of first transport rollers 29, the second changeover flapper 24 is changed over to the position indicated by the double-dotted line in FIG. 3, whereby the trailing edge of the sheet P is directed toward the intermediate treatment tray 31. At this time, the pair of first transport rollers 29 are set to a sufficient rotational speed for kicking out the trailing edge of the sheet P.

(Sheet Post-Treating Portion)

Figure 4:
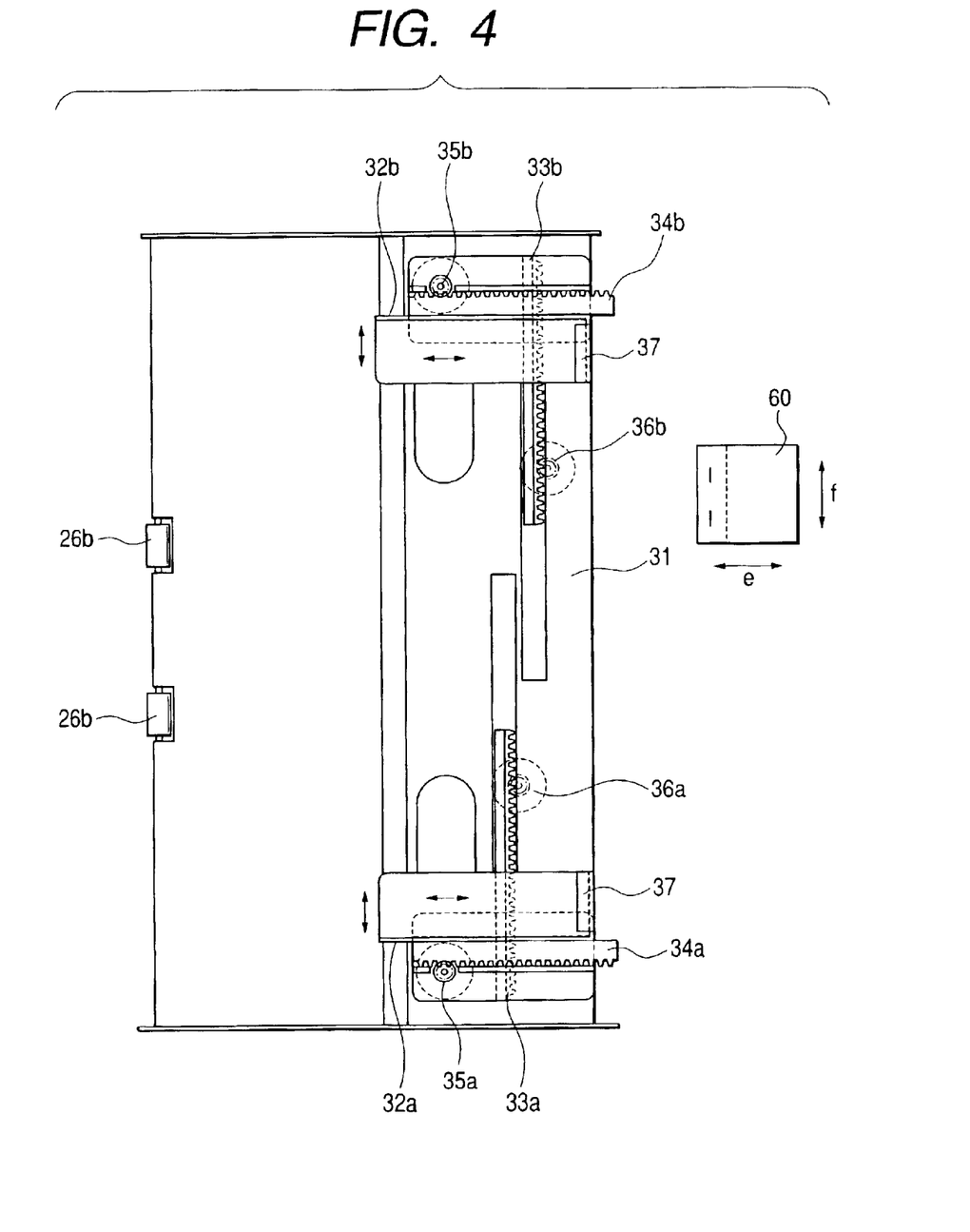
FIG. 4 is an illustration of aligning means.

The sheets P transported to the intermediate treatment tray 31, as shown in FIG. 3, are held in a substantially vertical state and aligned, and are subjected to stapling treatment (sheet stitching treatment) by a staple unit 60 provided at the lower end portion for movement in the directions indicated by the arrows "e" and "f". Therefore, the intermediate treatment tray 31, as shown in FIG. 4, is provided with aligning means for aligning the width of the sheet with this side/the inner part of the apparatus each time a sheet is stacked. FIG. 4 is an illustration of the aligning means in which the cross direction of the sheet (a direction orthogonal to the sheet transport direction) is shown as a vertical direction.

The aligning means is such that as shown in FIG. 4, there are disposed a front-aligning plate 32a and a rear-aligning plate 32b for aligning this side (this side in FIG. 1) and the inner part side (the inner part side in FIG. 1) in the cross direction of the sheet. The front-aligning plate 32a and the rear-aligning plate 32b are provided for reciprocal movement in a vertical direction as viewed in FIG. 4 integrally with width aligning racks 33a and 33b, respectively, and are designed to be reciprocally moved to right and left as viewed in FIG. 4 by sheet-stack delivery racks 34a and 34b provided integrally with the front-aligning plate 32a and the rear-aligning plate 32b, respectively, and sheet-stack delivery motors 35a and 35b provided on the width aligning racks 33a and 33b, respectively.

The width aligning racks 33a and 33b are mounted for reciprocal movement in the cross direction of the sheet relative to the intermediate treatment tray 31, and are designed to be reciprocally moved in the cross direction of the sheet by width aligning motors 36a and 36b, respectively.

Hit reference walls 37, which provide the reference during post-treatment are provided on the lower ends (the right ends as viewed in FIG. 4) of the front-aligning plate 32a and the rear-aligning plate 32b. The hit reference walls 37 may have a portion thereof fixedly provided on the intermediate treatment tray 31.

Provision is made of a staple unit 60 for staple-treating the sheet bundle transported to the intermediate treatment tray 31 and having had its cross direction aligned by the aligning means, and this staple unit 60 is designed to be moved in the directions indicated by the arrows "f" and "e" by driving means (not shown) during staple, and operate, and is movably provided so as not to interrupt the transport route of the sheet bundle.

The sheet P transported to the intermediate treatment tray 31, as shown in FIG. 3, hits against and is stacked on the hit reference wall 37 located on the lower end of the intermediate treatment tray with the aid of gravity. In the present embodiment, the hit reference walls 37 are provided on the lower ends of the front-aligning plate 32a and the rear-aligning plate 32b and therefore, when the sheet is transported to the intermediate treatment tray 31, the interval between the front-aligning plate 32a and the rear-aligning plate 32b is set so as to be wider than the width of the transported sheet and so that the sheet may stand by at a standby position in which the lower end of the sheet which has fallen to the intermediate treatment tray 31 with the aid of gravity can be supported by the front and rear hit reference walls 37.

Also, the end portions of the hit reference walls 37 as shown in FIG. 3, are erectly formed so as to assume a U-shaped cross section so that the sheet P having hit against them may not deviate and fall.

When the sheet falls along the intermediate treatment tray 31 and the lower end thereof hits against the hit reference wall 37, the width aligning motors 36a and 36b are driven and the drive thereof is transmitted to the width aligning racks 33a and 33b, whereby the front-aligning plate 32a and the rear-aligning plate 32b are moved in the cross direction of the sheet to thereby effect alignment in the cross direction of the sheet. When the alignment is completed, the front-aligning plate 32a and the rear-aligning plate 32b are returned to the aforementioned standby position.

In this manner, the sheets successively delivered are aligned one by one and a predetermined number of sheets are stacked on the intermediate treatment tray 31 and become the shape of a bundle.

When for example, the operating portion instructs the staple unit 60 to effect stapling treatment on the aligned sheet bundle, staples are driven into the sheet bundle by the staple unit 60 and the sheet bundle is stapled. When this post-treatment such as stapling is completed, as shown in FIGS. 5 and 6, the front-aligning plate 32a and the rear-aligning plate 32b are upwardly pushed by the driving of the sheet-stack delivery racks 34a, 34b and the sheet-stack delivery motors 35a, 35b, and the sheet bundle P' after post-treated is transported by the reference walls 37 formed integrally with the aligning plates 32a and 32b until at least the leading edge thereof arrives at the pair of sheet-stack delivery rollers 26a and 26b.

Figure 5:
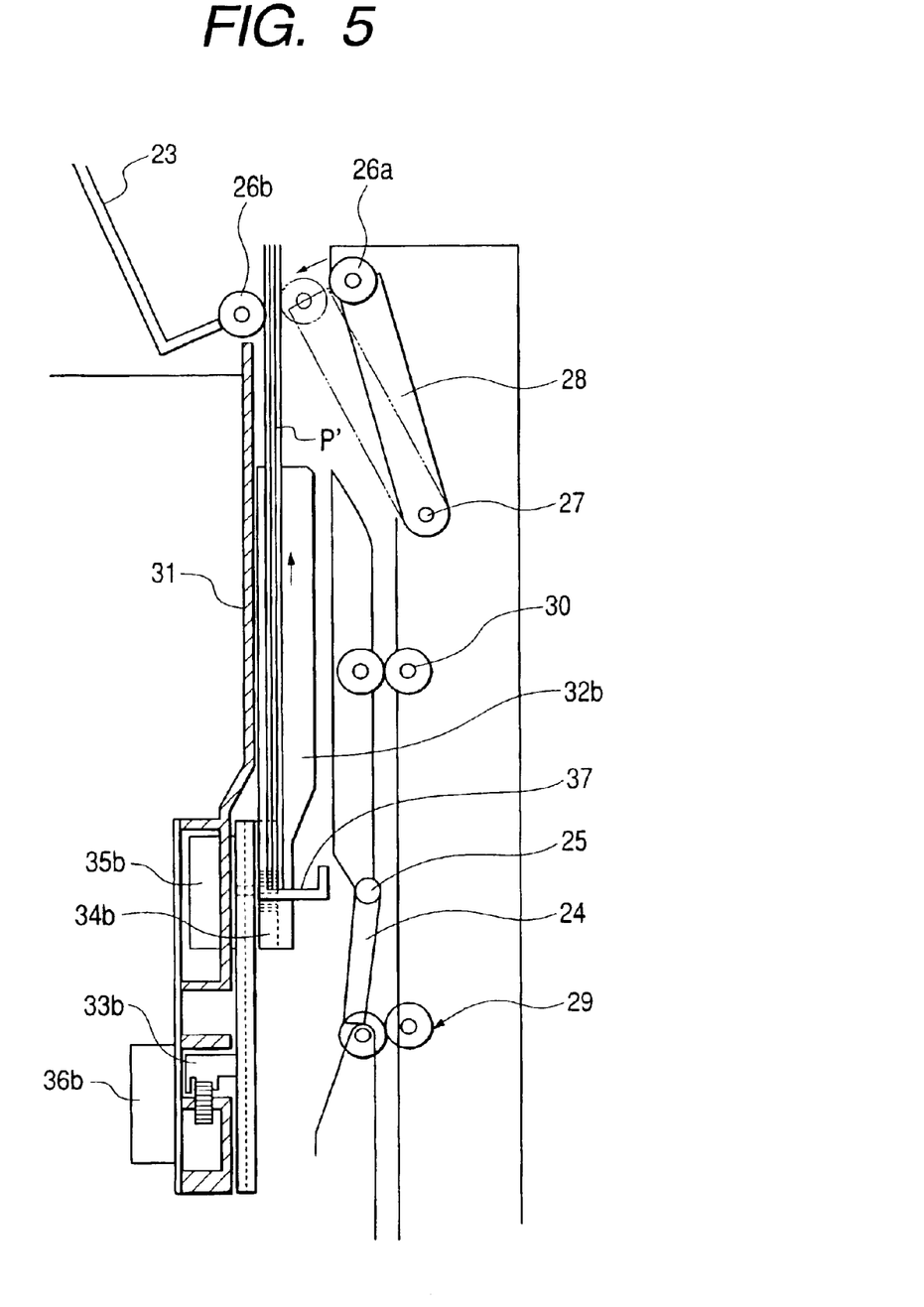
FIG. 5 is an illustration of a state in which an intermediate treatment tray is upwardly moved.
Figure 6:
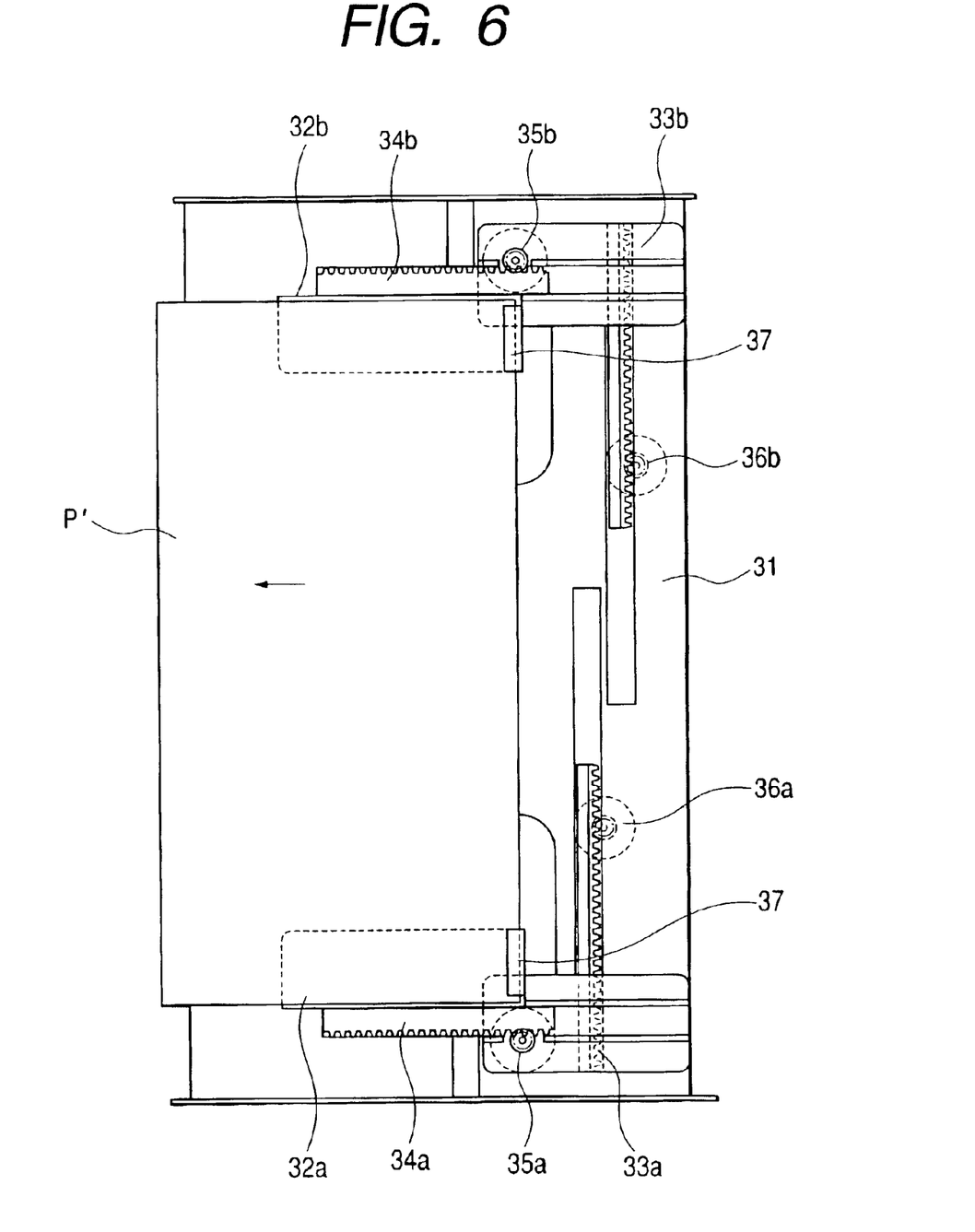
FIG. 6 is an illustration of the state in which the intermediate treatment tray is upwardly moved.

When the leading edge of the sheet bundle P' goes beyond the sheet-stack delivery roller 26b, the rockable guide 28 is pressed into a position indicated by the double-dotted line in FIG. 5, and the sheet bundle P' is delivered to the delivery tray 23 by the pair of sheet-stack delivery rollers 26a and 26b.

Thereafter, the front-aligning plate 32a and the rear-aligning plate 32b are downwardly moved by the sheet-stack delivery motors 35a and 35b being reversely rotated, and when the descent thereof to a predetermined position is detected by a position sensor (not shown), the sheet-stack delivery motors 35a and 35b are stopped from being driven, thus becoming ready for the post-treatment in the next job.

While in the present embodiment, there has been shown an example in which as sheet post-treatment, stapling treatment is effected by the staple unit, sheet post-treatment is not limited to stapling treatment. For example, it is also possible as a matter of course to provide a punch unit to thereby effect punching treatment (treatment for cutting holes in a sheet).

(Sheet Delivery Portion)

Also, a plurality of delivery trays 23 provided above the image reading portion 1 in the present embodiment, as shown in FIG. 1, are arranged in a lateral direction (a direction intersecting with the sheet delivery direction, and in the present embodiment, a horizontal direction) in a substantially vertically erect state, and are designed to be moved to right and left by a lead cam 38 with a spiral groove rotated in the direction indicated by the arrow "c" by a drive source 61, and a guide rail 39a provided on a rear side plate 39 supporting the rear sides of the delivery trays 23.

That is, runners 40 engaged with the groove of the lead cam 38 are provided on the lower portions of the front and rear ends of each delivery tray 23, and the delivery trays 23 are laterally movable by the rotation of the lead cam 38. The tray position is detected by a position detecting sensor (not shown) is detected and the trays are stopped at a predetermined position, whereby the sheet or the sheet bundle delivered by the pair of sheet-stack delivery rollers 26a and 26b is delivered to predetermined one of the delivery trays 23.

The above-described delivery, in the case of the sort mode, is effected in a state in which the respective delivery tray 23 are successively moved with the delivery of sheets, whereby the sheets are sorted on the plurality of delivery trays 23. On the other hand, in the case of the non-sort mode, the rightmost delivery tray 23 shown in FIG. 1 is moved to a position for receiving the delivered sheets, and the sheets are delivered to this tray.

As previously described, the plurality of delivery trays are disposed in a lateral direction and therefore, the delivered sheets can be easily taken out. Also, the delivered sheets become substantially erect because they are supported by the delivery trays 23, and a delivery space in the lateral direction is not required even if the size of the sheet becomes large.
{Opening and Closing of the Image Reading Portion}

In the present embodiment, as previously described, the delivery trays 23 are disposed above the image reading portion 1 and therefore, if an attempt is make to upwardly open the entire image reading portion, the image reading portion may hit against the delivery trays 23. For this reason, the opening and closing construction of the image reading portion is constructed as described below.
(Opening and Closing of the Original Pressing Portion)

The ADF 4b functioning also as an original pressing portion disposed on the scanning optical system 4a in the present embodiment is of a sheet-through type and can also read the original. That is, in FIG. 1, sheet originals set on an original tray portion 62 are U-turn transported by an original transporting portion 63 comprised of rollers such as a pickup roller 63a, transport rollers 63b and an original pressing roller 63c and an original guide and delivered to a delivery tray 64. Prior to this U-turn transport, the light source 6 and scanning mirror 7 of the scanning optical system 4 are moved to a position opposed to the original pressing roller 63c, and light is applied to the transported original to thereby read it.

Figure 7A:
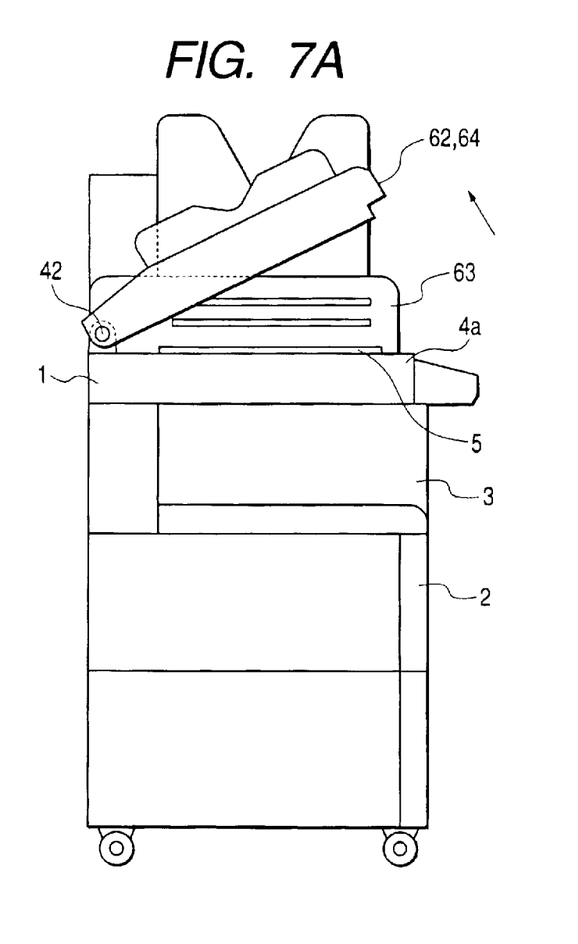
FIGS. 7A and 7B are a left side view and a cross-sectional view, respectively, showing a state in which the original pressing portion of an ADF is opened.
Figure 7B:
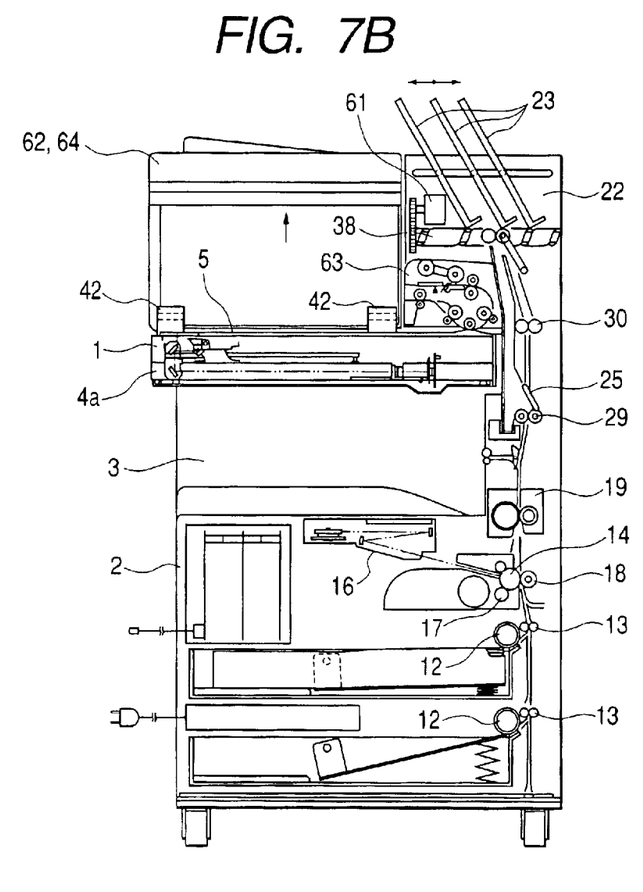

In the above-described construction, the original transporting portion 63 is fixed to the main body of the apparatus, and an upper delivery portion 22 is located on the upper portion thereof. On the other hand, the original tray portion 62 and a delivery tray portion 64 are divided from the original transporting portion 63, and the delivery portion 22 is not located on the upper portion thereof. The original tray portion 62 and the delivery tray portion 64, as shown in FIGS. 7A and 7B, are pivotally movable integrally with each other about the rotary hinge portion 42, and are upwardly openable relative to the fixed scanning optical system 4a.

Therefore, when a book original or the like is to be read, the original tray portion 62 and the delivery tray portion 64 are opened while the scanning optical system 4a remains fixed, and the original can be set on the platen glass plate 5 and be read. At this time, the original tray portion 62 and the delivery tray portion 64 act as an original pressure contact portion.

The openable and closable original pressing portion is formed by only the trays (the original tray portion 62 and the delivery tray portion 64) and is therefore light in weight, and has the advantages that the construction of the hinge or the like can be simplified and that the operability is excellent.
(Opening and Closing of the Scanning Optical System)

Figure 8A:
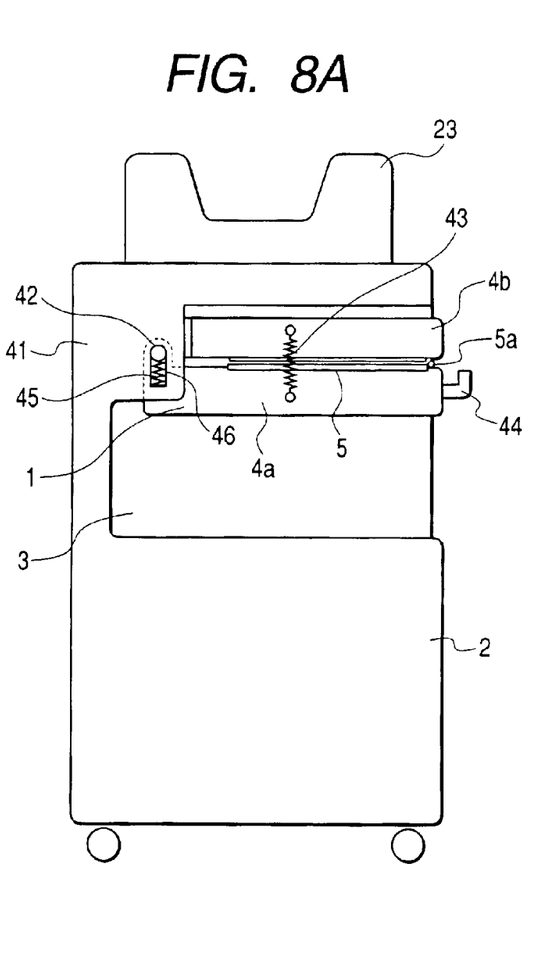
FIGS. 8A and 8B are side illustrations of the main body of the image forming apparatus according to the first embodiment as it is seen from its left side.
Figure 8B:
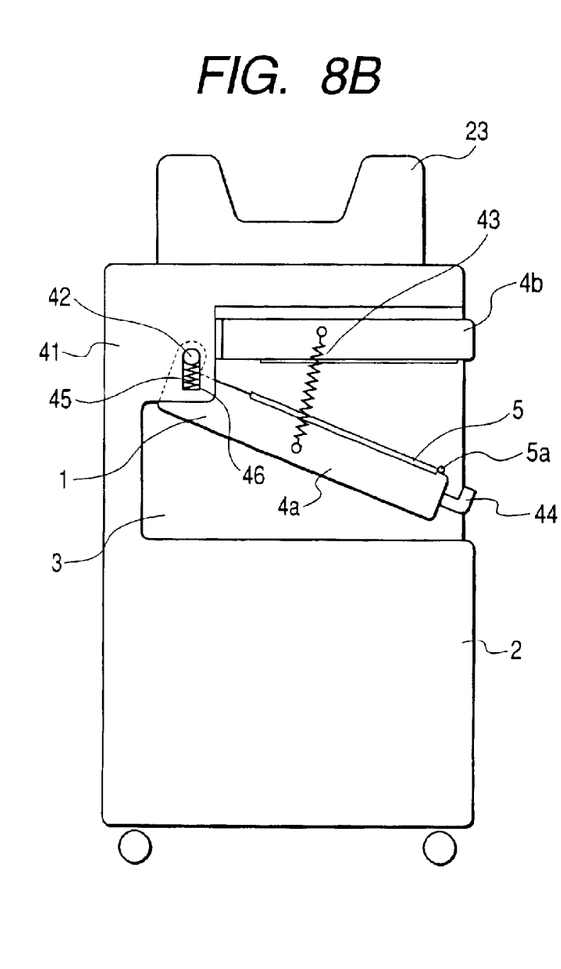

Also, as shown in FIGS. 8A and 8B, it is possible to design the scanning optical system 4a so as to be movable to the delivery space portion 3 (movable in the direction indicated by the arrow "d" in FIG. 1). FIGS. 8A and 8B are side illustrations of the main body of the image forming apparatus according to the present embodiment as it is seen from its left side.

In the construction shown in FIGS. 8A and 8B, the ADF 4b is fixed to the housing 41 of the apparatus, and the image reading portion 1 provided with the scanning optical system 4a is designed such that the scanning optical system 4a portion is pivotally movable relative to the ADF 4b with the rotary hinge portion 42 as a fulcrum, and in its normal state, it is pulled up to and fixed at a position shown in FIG. 8A by a tension spring 43.

When the operator places an original on the platen glass plate 5 of the image reading portion 1 and is to perform image reading, if the operator depresses a grip 44 provided on the scanning optical system 4a on this side of the apparatus, the scanning optical system 4a portion is rotatively moved about the rotary hinge portion 42 to the area of the delivery space portion 3 and the platen glass plate 5 becomes exposed as shown in FIG. 8B. In this state, the original is set in alignment with a hit reference 5a formed on respect to the platen glass plate 5 on this side of the apparatus.

When the operator holds the grip 44 in his hand and returns the scanning optical system 4a, the scanning optical system 4a becomes pressed against the ADF 4b by the tensile force of the tension spring 43, as shown in FIG. 8A, and in this state, scanning and reading are effected.

The tension spring 43 is restrained between the original transporting portion 63 fixed to the main body of the apparatus and the scanning optical system 4a, and when as previously described, the original tray portion 62 and the delivery tray portion 64 are to be upwardly opened, the tensile force of the tension spring 43 does not act.

Figure 9A:
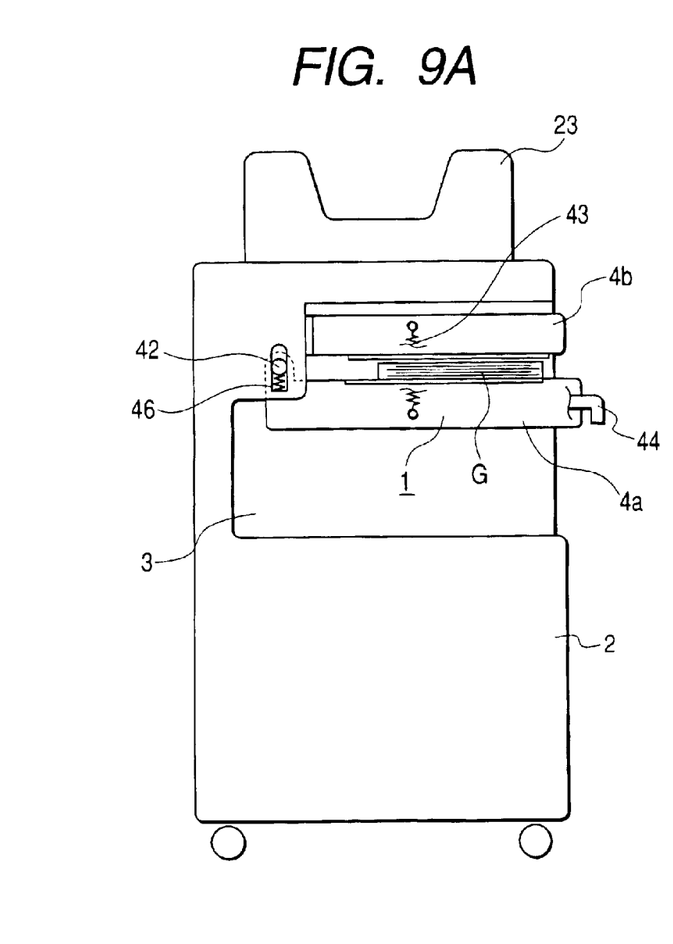
FIGS. 9A and 9B are illustrations of a state when a thick original is read.
Figure 9B:
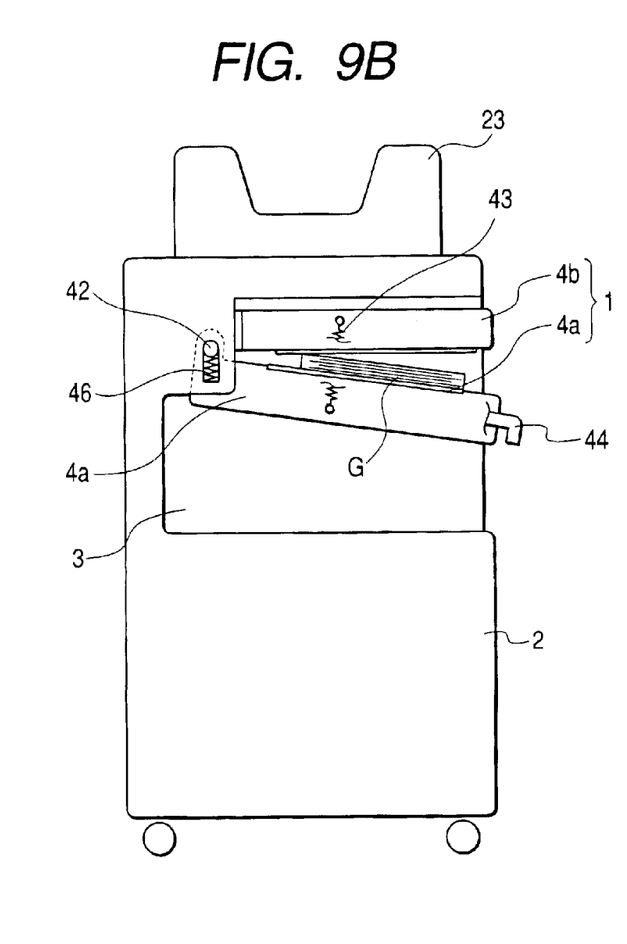

Also, the rotary hinge portion 42 is movable within the range of a longitudinally long slot 45 formed in the housing 41 of the apparatus, and is biased toward the upper edge portion of the longitudinally long slot 45 by a compression spring 46. Therefore, when as shown in FIGS. 9A and 9B, a thick book original G is set on the platen glass plate 5, the compression spring 46 provided on the rotary hinge portion 42 of the image reading portion 1 contracts, whereby the thick original is pushed against and in parallelism to the platen glass plate.

As described above, the image reading portion 1 is made movable to the area of the delivery space portion 3, whereby it becomes possible to set the original without moving the delivery trays 23 disposed on the upper portion of the image reading portion 1. Thus, the space saving of the apparatus becomes possible without spoiling the visual confirmability and taking-out operability of the sheets delivered to the delivery trays 23.

When an original extending over the entire platen glass plate 5 is to be set, as shown in FIGS. 8A and 8B, the original can be set with the ADF 4b fixed and with the scanning optical system 4a opened to the delivery space portion 3 side, and when an original of such a degree of size as will not extend to the original transporting portion 63 is to be set, as shown in FIGS. 7A and 7B, the original can be set with the scanning optical system 4a fixed and with the original tray portion 62 which is an original pressing portion and the original transporting portion 63 upwardly opened.
[Second Embodiment]

Figure 10:
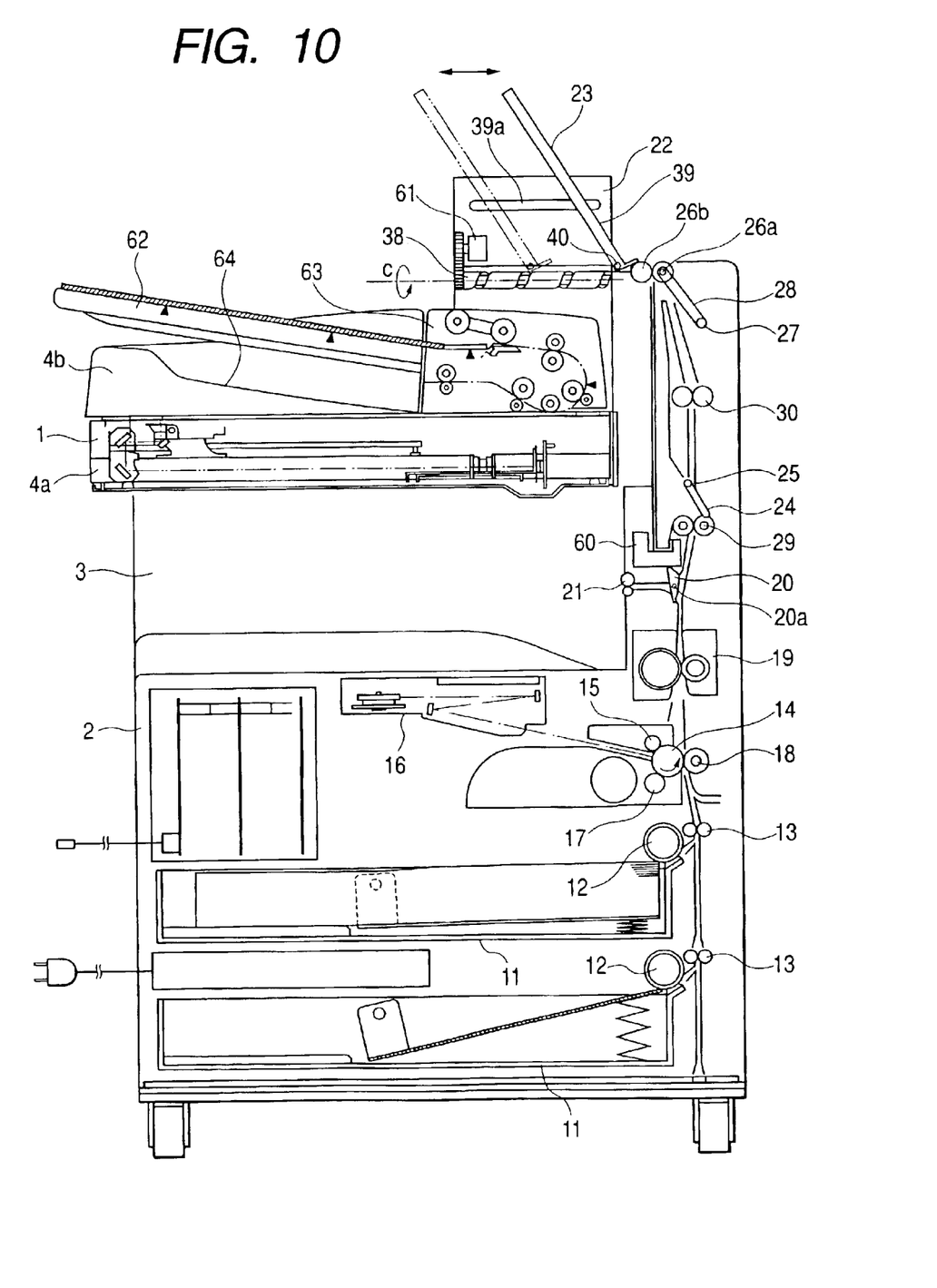
FIG. 10 is a general cross-sectional illustration of an image forming apparatus according to a second embodiment which uses a single delivery tray.

While in the aforedescribed first embodiment, there has been shown an example in which a plurality of delivery trays 23 are provided in the delivery portion 22 disposed above the sheet post-treating portion, there may be adopted a construction as shown in FIG. 10 wherein a single delivery tray 23 is substantially vertically provided in the delivery portion 22. FIG. 10 is a typical illustration of an image forming apparatus according to a second embodiment, and in FIG. 10, members functionally similar to those in the first embodiment are given the same reference characters.

In the present embodiment, the delivery tray 23 is moved in conformity with the amount of sheets delivered to the delivery portion 22, and holds the delivered sheets in their erect state.

[Third Embodiment]

Figure 11:
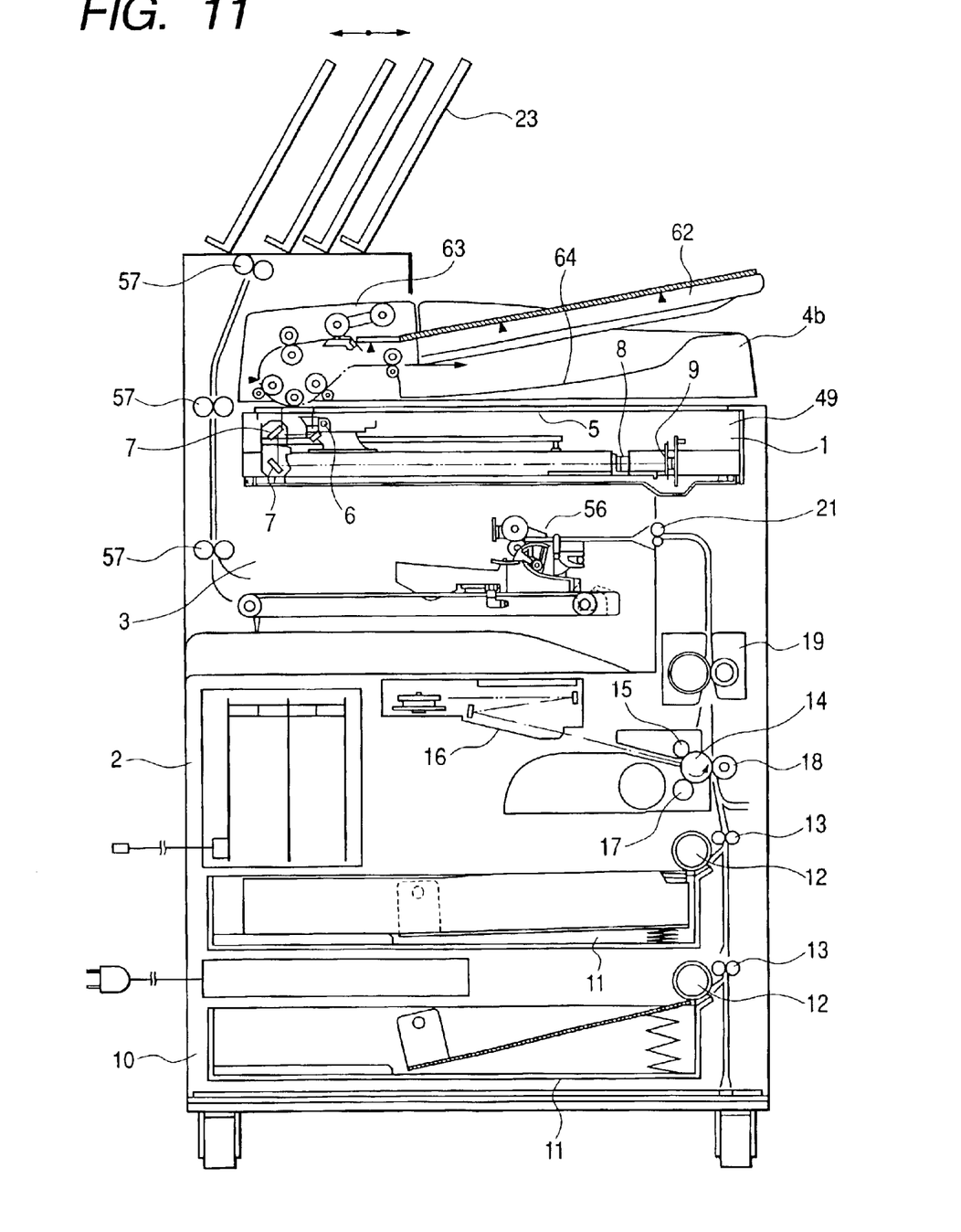
FIG. 11 is an illustration of the construction of an image reading apparatus according to a third embodiment showing another form of movement.

FIG. 11 is a typical illustration of an image forming apparatus according to a third embodiment, and shows an example in which the sheet treating apparatus is disposed in the delivery space portion 3. In the other points, the construction of this embodiment is similar to that of the aforedescribed first embodiment (members functionally similar to those in the first embodiment are given the same reference characters).

In this embodiment, sheets passed through the fixing device 19 and between the delivery rollers 21 of the main body are subjected to post-treatment such as stitching by a stapler in a sheet post-treating portion 56, whereafter they are delivered to and stacked on the delivery trays 23 disposed above the image reading portion 1 by delivery rollers 57.

The sheet post-treating portion 56, as in the aforedescribed first embodiment, aligns the sheets successively transported to the sheet post-treating portion 56 by the delivery rollers 21 in the cross direction thereof by the aligning means and makes them into a sheet bundle, and staple-treats it by the staple unit, and thereafter grips and transports the sheet bundle by a gripper (not shown) or the like, and further transports it upwardly by the delivery rollers 57 and delivers it to the delivery tray 23.

Also, the image reading portion 1 is designed to be capable of being pulled out toward this side with respect to the main body of the apparatus, and when reading is to be effected by the image reading portion 1 with the ADF 4b opened, the image reading portion 1 is pulled toward this side and the operation is performed.

In the present embodiment, the sheet post-treating position 56 can be disposed substantially horizontally in the delivery space portion 3 and the sheets can be treated in their substantially horizontal posture and therefore, various sheet treating apparatuses such as for stapling of large capacity, two-place stitching and punching can be installed.

What is claimed is:

1. A sheet treating apparatus for treating a sheet on which an image has been formed, comprising:
   a sheet treating portion for treating the sheet;
   sheet transporting means for upwardly transporting the sheet; and
   sheet delivery means disposed above said sheet treating portion,
   wherein said sheet delivery means has a pair of delivery rollers for substantially vertically upwardly delivering the sheet and at least one delivery tray disposed in a substantially vertical state for stacking thereon the sheet delivered by said pair of delivery rollers, and
   wherein said delivery tray is movable in a lateral direction.

2. A sheet treating apparatus according to claim 1, wherein said sheet transporting means transports the sheet substantially vertically upwardly, and said sheet delivery means is disposed substantially vertically upwardly of said sheet transporting means.

3. A sheet treating apparatus according to claim 1, wherein said sheet treating portion has a sheet stacking surface constructed substantially vertically, and said sheet transporting means is disposed substantially parallel to and adjacent to said sheet stacking surface.

4. A sheet treating apparatus according to claim 3, wherein said sheet transporting means is provided with changeover means for changing over a sheet transport between a sheet transport toward said sheet stacking surface and a sheet transport toward said sheet delivery means.

5. A sheet treating apparatus according to claim 1, wherein said sheet delivery means has a plurality of delivery trays disposed in the lateral direction.

6. A sheet treating apparatus for treating a sheet on which an image has been formed, comprising:
   a sheet treating portion for treating the sheet;
   a pair of delivery rollers for substantially vertically upwardly delivering the sheet; and
   a delivery tray provided at a level higher than said sheet treating portion and disposed in a substantially vertical state for stacking thereon the sheet delivered by said pair of delivery rollers,
   wherein said delivery tray is movable in a lateral direction.

7. An image forming apparatus comprising:
   an image reading portion for reading an image;
   an image forming portion disposed below said image reading portion for forming an image on a sheet;
   a sheet delivery space portion provided in a housing of the apparatus between said image reading portion and said image forming portion; and
   a sheet treating apparatus as recited in any one of claims 1–6.

* * * * *

UNITED STATES PATENT AND TRADEMARK OFFICE
CERTIFICATE OF CORRECTION

PATENT NO. : 6,845,228 B2
DATED : January 18, 2005
INVENTOR(S) : Toshimasa Suzuki et al.

It is certified that error appears in the above-identified patent and that said Letters Patent is hereby corrected as shown below:

Column 2,
Line 21, "cross sectional" should read -- cross-sectional --.

Column 6,
Line 63, "is detected" should be deleted.

Column 7,
Line 3, "tray" should read -- trays --.
Line 18, "make" should read -- made --.

Column 8,
Line 17, "on" should read -- with --.

Signed and Sealed this

Thirty-first Day of May, 2005

JON W. DUDAS
*Director of the United States Patent and Trademark Office*